United States Patent
Chakraborty et al.

(10) Patent No.: US 10,560,302 B2
(45) Date of Patent: Feb. 11, 2020

(54) METHOD AND SYSTEM FOR JOINT TRAINING SEQUENCES DESIGN FOR CORRELATED CHANNEL AND FREQUENCY OFFSETS ESTIMATION

(71) Applicant: Indian Institute of Technology Kharagpur, Midnapore (IN)

(72) Inventors: Sucharita Chakraborty, Kharagpur (IN); Debarati Sen, Kharagpur (IN)

(73) Assignee: Indian Institute of Technology Kharagpur, West Bengal (IN)

( * ) Notice: Subject to any disclaimer, the term of this patent is extended or adjusted under 35 U.S.C. 154(b) by 0 days.

(21) Appl. No.: 16/114,710

(22) Filed: Aug. 28, 2018

(65) Prior Publication Data

US 2019/0068426 A1    Feb. 28, 2019

(30) Foreign Application Priority Data

Aug. 28, 2017   (IN) .............................. 201731030425

(51) Int. Cl.
*H04B 7/02*  (2018.01)
*H04L 27/26* (2006.01)
(Continued)

(52) U.S. Cl.
CPC ......... *H04L 27/2657* (2013.01); *H04B 7/024* (2013.01); *H04B 7/0626* (2013.01);
(Continued)

(58) Field of Classification Search
CPC ............ H04L 27/2657; H04L 25/0226; H04B 17/318; H04B 7/0626; H04B 7/024; H04B 7/0851; H04B 7/0413
See application file for complete search history.

(56) References Cited

U.S. PATENT DOCUMENTS

2003/0016621 A1   1/2003   Li
2004/0062211 A1   4/2004   Uhlik
(Continued)

OTHER PUBLICATIONS

"*Optimized Training Sequences for Spatially Correlated MIMO-OFDM*"—Hoang D. and et. al., IEEE Trans. on Wireless Commun., vol. 9, No. 9, pp. 2768-2778, 2010.
(Continued)

*Primary Examiner* — Dhaval V Patel
(74) *Attorney, Agent, or Firm* — The Dobrusin Law Firm, PC

(57) ABSTRACT

In distributed communication networks, the signal received at the destination is characterized by unknown multiple carrier frequency offsets (MCFOs) and improper channel state information (CSI). The knowledge of offsets and channel gains are required for coherent deployment of distributed systems. Hence, joint training sequence (TS) design method is proposed for joint estimation of MCFOs and channel estimation over spatially correlated channel. Thus, the present invention provides a method of providing joint estimation for distributed communication systems with multiple antennas at the nodes over spatial correlated channels. The designed optimal training sequences are short length and spectrally efficient. The designed training sequence produces zero cross-correlation, facilitating channel estimation without matrix inversion, significantly lowers the complexity of the estimation algorithm.

47 Claims, 10 Drawing Sheets

(51) Int. Cl.
*H04B 7/08* (2006.01)
*H04B 7/024* (2017.01)
*H04B 7/06* (2006.01)
*H04L 25/02* (2006.01)
*H04B 17/318* (2015.01)
*H04B 7/0413* (2017.01)

(52) U.S. Cl.
CPC ......... *H04B 7/0851* (2013.01); *H04B 17/318* (2015.01); *H04L 25/0226* (2013.01); *H04L 27/261* (2013.01); *H04L 27/2675* (2013.01); *H04L 27/2695* (2013.01); *H04B 7/0413* (2013.01)

(56) References Cited

U.S. PATENT DOCUMENTS

2006/0280266 A1 12/2006 Li
2010/0008221 A1* 1/2010 Hong ................. H04L 41/5038
                                                        370/226
2012/0300644 A1 11/2012 Fung et al.
2018/0152966 A1* 5/2018 Goldhamer ......... H04W 74/002
2019/0020381 A1* 1/2019 Tooher ............. H04W 72/0446

OTHER PUBLICATIONS

"*Optimal Training Design for Channel Estimation in Decode-and-Forward Relay Networks with Individual and Total Power Constraints*"—Feifei Gao and et. al., IEEE Trans. on Signal Process. vol. 56, No. 12, pp. 5937-5949, 2008.

"*Optimal Superimposed Training Design for Spatially Correlated Fading MIMO Channels*" IEEE Trans on Wireless Commun. vol. 7, No. 8, pp. 3206-3217, 2008.

"*Robust Training Sequence Design for Spatially Correlated MIMO Channel Estimation*"—Nafiseh Shariati and et. al., IEEE Trans. on Vehicular Tech. vol. 60, No. 7, pp. 2882-2894, 2011.

"*Joint CFO and Channel Estimation for Multiuser MIMO-OFDM Systems with Optimal Training Sequences*"—Jianwu Chen and et. al., IEEE Trans. on Signal Process. vol. 56, No. 8, pp. 4008-4019, 2008.

* cited by examiner

| Node identification number (node id.) | Antenna number of each node | LUT row number corrs. Tx. Antenna pair | Threshold for MSE of channel estimation |

METHOD AND SYSTEM FOR JOINT TRAINING SEQUENCES DESIGN FOR CORRELATED CHANNEL AND FREQUENCY OFFSETS ESTIMATION

TECHNICAL FIELD OF THE INVENTION

The present subject matter described herein, in general, relates to frequency offset and channel estimation in wireless systems. More particularly, the invention relates to training sequence design for frequency offset and channel estimation in distributed wireless systems.

BACKGROUND OF THE INVENTION

In wireless communication systems, joint estimation of frequency offsets and channel gains is computationally complex. Generally, estimation in modern wireless communication is performed by sending a known template of signal called the training sequences and comparing the received training sequence with known pattern of training at the receiver. However, communication systems with multiple transmit and receive antennas require the estimation of frequency offset and channel matrix with dimension equal to the number of transmit and receive antennas. Cooperative communications or Distributed Multiple-Input Multiple-Output (DMIMO) systems have been emerging as a viable option for energy-efficient wireless networks because of its inherent merits of system coverage extension and capacity enhancement along with combating the limitations related to conventional collocated MIMO. The distributed MIMO architecture may be utilized for relaying the source message to a destination resulting in extension of cell coverage, and QoS enhancement through cooperative communication via virtual antenna array (VAA) structure.

On the other hand, orthogonal frequency division multiplexing (OFDM) is a well-known paradigm to support high data rate communications. Accordingly, DMIMO-OFDM system has emerged as a strong candidate for beyond fourth generation mobile communications. The reliable communication of DMIMO-OFDM system largely depends on estimating channel characteristics and multiple carrier frequency offsets (MCFOs) for each transmit-receive antenna pair. The joint estimation process is difficult and computationally complex in high data rate application in practice.

Cooperative or distributed multi-input multi-output (DMIMO) communication system is a key enabler of small-cell deployment, coverage extension, and capacity enhancement by composing an intelligent network with the wireless collaborative nodes. Orthogonal frequency division multiplexing (OFDM) is a strong paradigm because of its inherent robustness to frequency-selective channel. The benefits of DMIMO-OFDM system are maximized when all channels between the transmit antennas and the receive antennas are perfectly known. Imperfect knowledge of channel state information (CSI) causes reduction of capacity and bit error rate (BER) of DMIMO systems.

Performance of DMIMO systems also largely depends on multiple carrier frequency offsets (MCFOs) resulting from individual oscillator of each distributed transmitting nodes and multiple antenna interference (MAI) between received signals. MAI makes MCFOs estimation more difficult. Hence, the knowledge of MCFOs and channel gains are required for coherent deployment of DMIMO-OFDM systems. In practice, joint estimation process is carried out by two techniques; Blind-based and training sequences (TS) based. Blind estimation does not exploit the knowledge of training symbols, and focus on deterministic or stochastic properties of the system. Hence, it does not provide robust estimation for a scenario like DMIMO systems as the wireless nodes are distributed over a geographical area. In training sequence (TS) based method, the TS may be superimposed with information symbols in order to save the transmission bandwidth. The accuracy in such method severely suffers from the interference of information symbols. In contrast, TS and information bearing symbols may be sent in different time slots in time division multiplexing (TDM) mode.

In TDM, the estimation process is dependent on optimal TS design. Accordingly, there is a need to design joint optimal training sequence (TS) for estimating spatially correlated channel characteristics and multiple carrier frequency offsets (MCFOs) in DMIMO-OFDM system in association with its method of generation and apparatus.

For existing documents related to training sequence design for joint channel and frequency offsets estimation in wireless system, reference is made to a non-patent literature "*Optimized Training Sequences for Spatially Correlated MIMO-OFDM*"—Hoang D. and et. al., IEEE Trans. on Wireless Commun., vol. 9, no. 9, pp. 2768-2778, 2010, wherein collocated MIMO-OFDM system is considered and optimization criterion is based on particular channel estimator (MMSE).

Reference is also made to document, "*Optimal Training Design for Channel Estimation in Decode-and-Forward Relay Networks with Individual and Total Power Constraints*"—Feifei Gao and et. al., IEEE Trans. on Signal Process. vol. 56, no. 12, pp. 5937-5949, 2008, wherein spatial correlation has not taken into account and optimization criterion is based on minimization of particular estimator's performance (maximum likelihood (ML) and MMSE).

Reference is also made to document, "*Optimal Superimposed Training Design for Spatially Correlated Fading MIMO Channels*" IEEE Trans on Wireless Commun. vol. 7, no. 8, pp. 3206-3217, 2008, wherein collocated MIMO systems is considered and MMSE channel estimation is the optimization objective function.

Reference is also made to document, "*Robust Training Sequence Design for Spatially Correlated MIMO Channel Estimation*"—Nafiseh Shariati and et. al., IEEE Trans. on Vehicular Tech. vol. 60, no. 7, pp. 2882-2894, 2011, wherein collocated MIMO system is considered and optimization criterion is based on MMSE channel estimation.

Reference is further made to document, "*Joint CFO and Channel Estimation for Multiuser MIMO-OFDM Systems with Optimal Training Sequences*"-Jianwu Chen and et. al., IEEE Trans. on Signal Process. vol. 56, no. 8, pp. 4008-4019, 2008, wherein Collocated MIMO system is considered and spatially correlated channel is not considered.

Reference is further made to document US20030016621, entitled "Optimum training sequences for wireless systems" wherein the effect of spatial correlation is not exploited.

Reference is also made to document US20060280266 A1, entitled "Optimum training sequences for wireless systems" wherein spatially correlated channel is not considered.

Reference is also made to document US20040062211 A1, entitled "Assigning training sequences based on spatial channels in a wireless communications system" wherein spatially correlated channel is not considered and joint training sequence design is also not considered.

Reference is further made to document US 20120300644A1, entitled "Method and device for estimating carrier frequency offsets" wherein estimation of frequency offsets is considered while training sequence design is not considered.

To summarize the drawbacks of the prior art: (a) Single parameter estimation method is considered for Collocated MIMO-OFDM system. (b) Optimization criterion is based on particular channel estimator's performance. (c) Spatial correlated channel is not taken into account.

Thus, modern wireless communication approaches towards 5G technology and also demands very high speed energy-efficient communications. Distributed multi-input multi-output (DMIMO) systems reinforce all the need of 5G communications by composing an intelligent network with the wireless collaborative nodes. The coherent deployment of DMIMO systems are based on the proper knowledge of channel state information (CSI), multiple carrier frequency offset (MCFO). Knowledge of such impairments may be obtained by sending a known sequence to the receiver resulting in a need of design of optimal training sequence (TS). The method of training sequence design in this patent provides a spectrally effective way of retrieving CSI and MCFO.

Accordingly, there is a need to develop a system and method for joint optimal Training Sequences design for spatially correlated channel estimation and frequency synchronization of distributed wireless systems that enables a spectrally effective way of jointly retrieving the information of MCFOs and channel gains in DMIMO-OFDM systems.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An objective of the present invention is to provide a system and a method of generation and utilization of optimal training sequences for joint channel and frequency offset estimation in distributed multiple-input multiple-output (DMIMO) orthogonal frequency division multiplexing (OFDM) systems over spatially correlated channel.

Another objective of the present invention is to provide an optimal method of training sequence design for collocated and distributed communication systems with multiple antenna node structure.

Accordingly, in one aspect, the present invention provides a method of generation and utilization of optimal training sequences (TSs) for joint channel and frequency offset estimation in distributed multiple-input multiple-output (DMIMO) orthogonal frequency division multiplexing (OFDM) system over spatially correlated channel in a wireless communication network, wherein said method comprising:
  sending, by a common central unit (CCU), a predefined TSs to plurality of source nodes provided with plurality of antennas;
  Transmitting, by the source node, said predefined TSs to a corresponding destination node and the destination node sends a measured received signal power (RSSI) to said CCU;
  Wherein, said CCU is configured to optimize or allocate power budgets for each transmit-receive antenna pair in each source-destination pair link according to said RSSI, and said CCU selects said optimal training sequences (TSs);
  Wherein said source nodes configured transmit OFDM packets to said destination according to said optimal training sequences (TSs).

In another aspect, there is provided a system for generation and utilization of optimal training sequences (TSs) according to the method steps as mentioned above, for joint channel and frequency offset estimation in distributed multiple-input multiple-output (DMIMO) orthogonal frequency division multiplexing (OFDM) system with plurality of antennas over spatially correlated channel, wherein said system comprising: plurality of source node, a common central unit (CCU), and a plurality of destination nodes;
  Wherein, said CCU configured to generate a look-up-table (LUT) containing generated optimal TSs and broadcast the LUT to said source nodes and multicast row number of LUT to source-destination link pair.

In both aspects, the destination estimates channel, calculates channel covariance matrix, noise covariance matrix and measures received signal power (RSSI). The destination sends RSSI, received signal, channel and noise covariance matrices to CCU.

In both aspects, the CCU allocates power budget for all source-destination pair link given the RSSI information.

In both aspects, the CCU defines a threshold on power budget.

In both aspects, the CCU configured to shut down a source-destination pair link if said power budget is less than said threshold.

In both aspects, if said power budget is more than said threshold, said CCU configured to generates $M_t R$ numbers of said optimal training sequences (TSs), where $M_t$ defines the number of transmitting antennas and R is the number of source nodes.

In both aspects, the CCU broadcasts a look-up table (LUT) containing the updated optimal training sequences, to said source-destination pair and multicast row number of LUT for next transmission.

In both aspects, the CCU multicasts row number of said LUT, node identification number, antenna number and threshold of MSE of channel estimation to each source-destination pair.

In both aspects, the source node transmits said OFDM packets to said destination node by using said optimal TSs selected as per said row number as instructed by CCU.

In both aspects, the destination node computes mean square error (MSE) of channel estimation.

In both aspects, if said MSE is greater than threshold, said destination node sends RSSI, received signal to CCU.

In both aspects, for the last packet transmission, said destination node configured to update said CCU about a last training sequence used, noise and channel covariance matrices.

In both aspects, for generation of TSs CCU computes hybrid Cramer-Rao bound (HCRB) for channel and frequency offsets.

In both aspects, HCRB for channel estimation is obtained by computing hybrid information matrix (HIM).

In both aspects, the HIM is obtained by taking the addition of expected value of Fisher information matrix (FIM) and prior information matrix (PIM).

In both aspects, the PIM is obtained from precomputed channel covariance matrix in the destination which was feed backed to CCU.

In both aspects, the PIM is constituted as $$\begin{bmatrix} R_h^{-1} & 0 \\ 0 & 0 \end{bmatrix},$$

where in $R_h$ is the channel covariance matrix with other entries zero as frequency offset is considered to be deterministic.

In both aspects, the frequency offset-channel coefficient correlation terms of expected $\text{FIF}\overline{FIM}_{ex}$ matrix are reduced to zero due to consideration of zero mean value of channel pdf.

In both aspects, the HCRB of channel is computed by taking the inverse of $\text{HIM}_{hh}$.

In both aspects, the HCRB for frequency offset estimation is obtained from $\text{HIM}_{ee}$.

In both aspects, the CCU computes singular values of HCRB of channel estimation matrix by eigen value decomposition.

In both aspects, the CCU computes singular values of HCRB of frequency offset estimation matrix by eigen value decomposition.

In both aspects, the CCU computes singular values of channel covariance matrix by eigen value decomposition.

In both aspects, the optimized singular value of training sequence ($\sigma_{C,i}$) for channel estimation is obtained by minimizing the singular value of HCRB of channel estimation summation over all the antennas subject to the total power constraint (P) and allocated power constraint for the typical source-destination link ($p_i$).

In both aspects, the method is non-linear. The optimal $\sigma_{C,i}$ of TS is obtained from the algorithm, where in ground and ceiling power levels for each transmit-receive link, calculated in CCU.

In both aspects, the ground power levels for each link is obtained by ½ of inverse of singular values of channel covariance matrix.

In both aspects, the ceiling power level for each link is obtained by addition of ½ of inverse of singular values of channel covariance matrix and allotted power budget of that link computed by CCU.

In both aspects, the source-destination link ($M_k$) is selected for transmission from the set of $M_tR$ ($M_k \leq M_tR$) such that summation of ground power levels over $M_k$ is less than or equal to the ceiling level of the typical link k.

In both aspects, the CCU calculates expected power level by performing the following calculation (ceiling power level of $k^{th}$ path-summation of ground levels over $M_k$)–(ceiling power level of $k^{th}$ path-summation of ceiling levels over all paths).

In both aspects, if expected power level is equal to overall power (P) of the system, CCU computes the power depth ($\gamma$) by the ceiling power level.

In both aspects, if expected power level is greater than overall power (P) of the system, CCU calculates the power depth ($\gamma$) (by Eq. (21) as mentioned in the following section).

In both aspects, if $\gamma$ is greater than ceiling power level of the $k^{th}$ link, CCU saturates $k^{th}$ link, no more power is poured to the typical link.

In both aspects, CCU distributes remaining power to other links with the power depth $\gamma$.

In both aspects, optimal singular value of TS is obtained by subtracting between power depth ($\gamma$) and ground power level of the particular $k^{th}$ link.

In both aspects, if expected power is less than overall system power (P), $M_k$ is updated for $(k+1)^{th}$ link.

In both aspects, the optimized singular value of training sequence ($\sigma_{C,i}$) for frequency offset estimation is obtained by minimizing the singular value of HCRB of frequency offset estimation summation over all the antennas subject to the total power constraint (P) and allocated power constraint for the typical source-destination link ($p_i$).

In both aspects, the method is non-linear. The optimal $\sigma_{C,i}$ of TS is obtained from the proposed algorithm, where, CCU initializes variables j and $k_j$ to zero.

In both aspects, the source-destination link ($M_k$) is selected such that summation of allotted power level for each link over $M_k$ is less than overall system power ($\Sigma_{k=1}^{M_k} p_k < P$)

In both aspects, the CCU computes two power levels (WL1 and WL2) for each transmit-receive link.

In both aspects, one power level WL1 is computed by taking summation of X over t where $k_j+1 \leq t \leq M_k$. X is obtained as multiplication of power allotted for each link ($p_i$) with square root of singular value of channel covariance matrix.

In both aspects, another power level WL2 is computed by following manner (total overall system power-summation of pi over $k_j+1$)×(summation of square root of singular value of channel covariance matrix over all links).

In both aspects, if WL1 is greater than WL2, CCU calculates optimal $\sigma_{C,i}$ of TS (using Eq. (25) as mentioned in the following section).

In both aspects, if WL1 is less than WL2, CCU sets $k_j+1=t$ and calculates optimal $\sigma_{C,i}$ of TS (using Eq. (26) as mentioned in the following section).

In both aspects, if $k_j+1$ is equal to $M_k$, increase kj to $k_j+1$ and CCU calculates optimal $\sigma_{C,i}$ of TS (using Eq. (25) as mentioned in the following section).

In both aspects, the optimal TS is designed by arranging the optimal singular values diagonally with other entries of the matrix zero (which is also shown using Eq. (27) as mentioned in the following section).

In both aspects, the length of designed optimal training sequences are equal to number of transmit antennas which have maximum power content multiplied with number of channel paths resulting in minimum length of training sequences.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The above and other aspects, features, and advantages of certain exemplary embodiments of the present invention will be more apparent from the following description taken in conjunction with the accompanying drawings in which.

Figures 3, 4A:
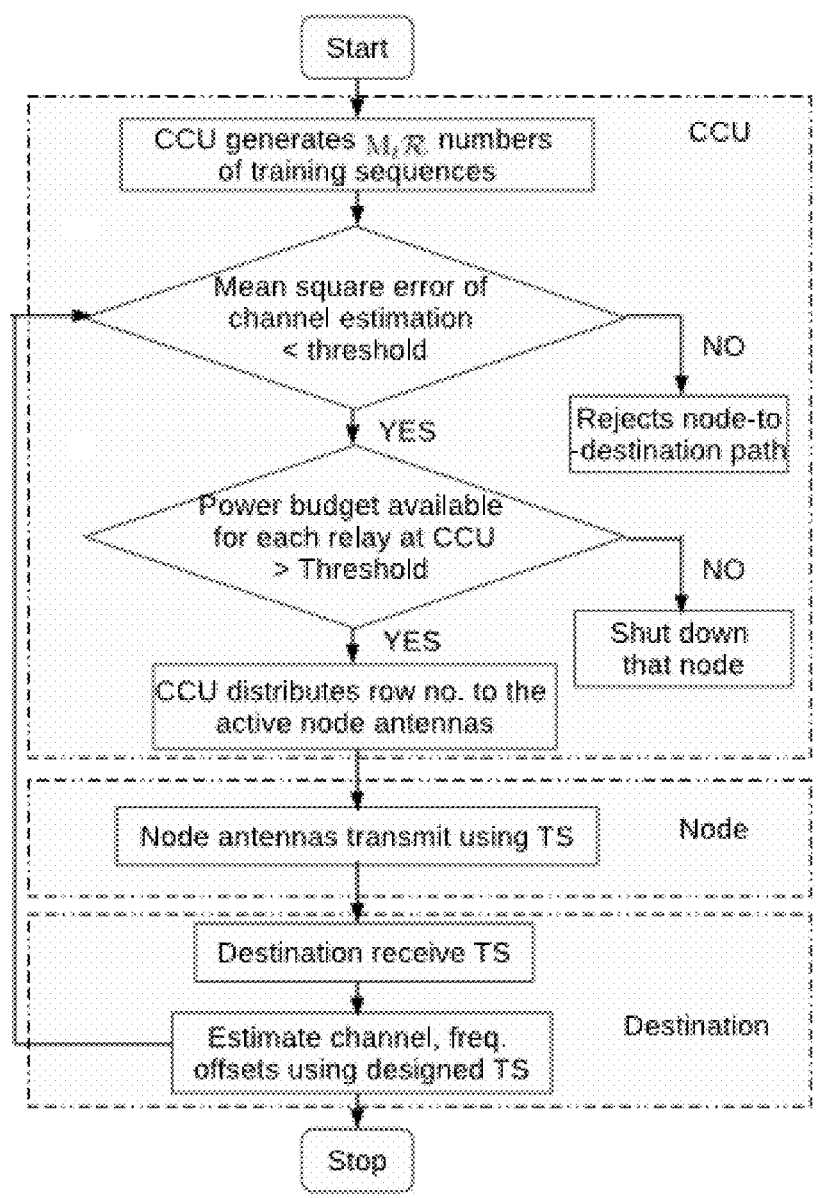
FIG. 3 shows the optimal Training Sequence information multicasted by CCU, according to one embodiment of present invention.
Figure 4B:
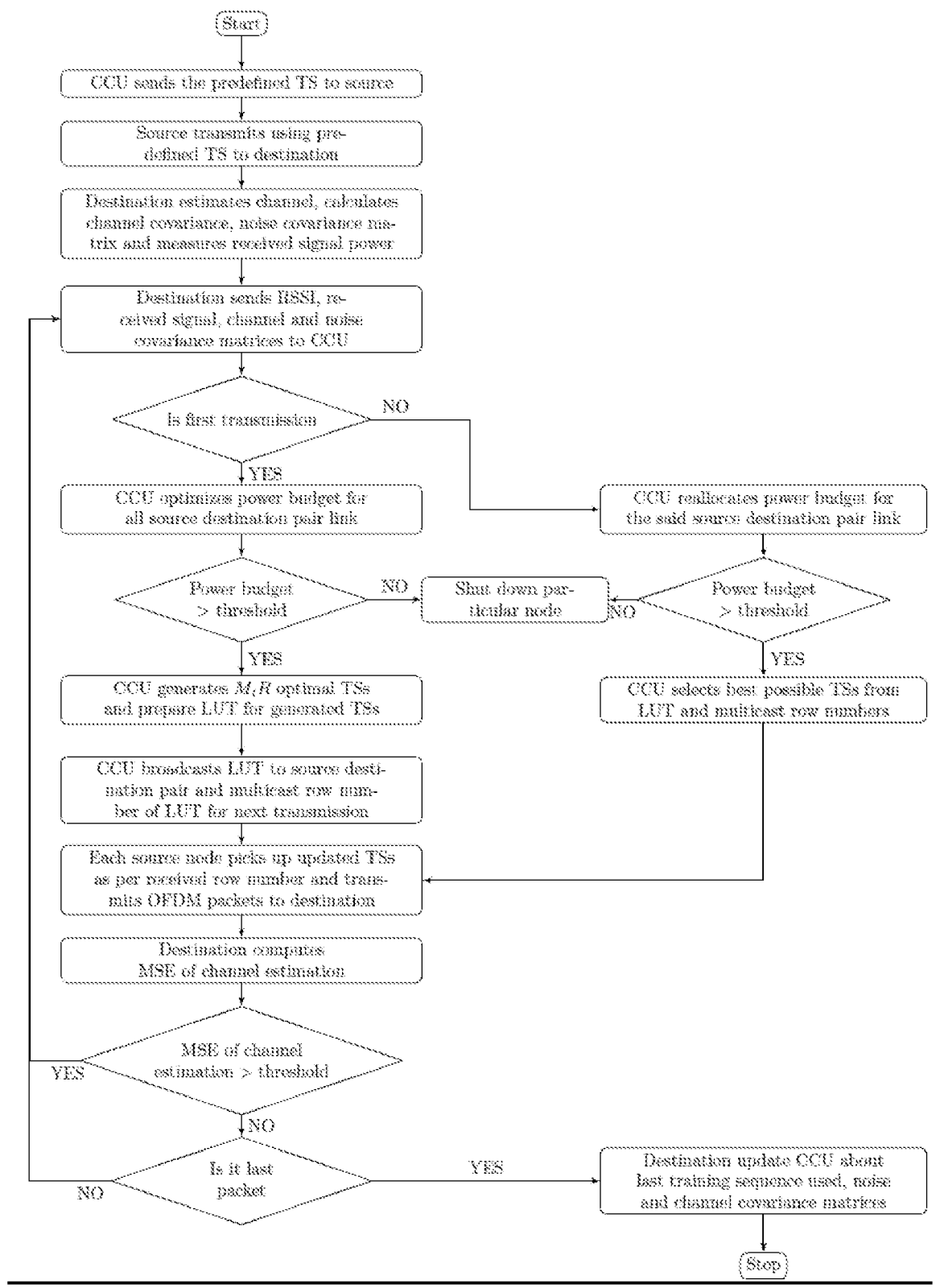

FIG. 4(a) illustration the process flow diagram of the use generated optimal TSs for estimating channel and frequency offsets, and the FIG. 4(b) shows the process flow diagram of training sequence generation, according to one embodiment of present invention.

Figure 5A:
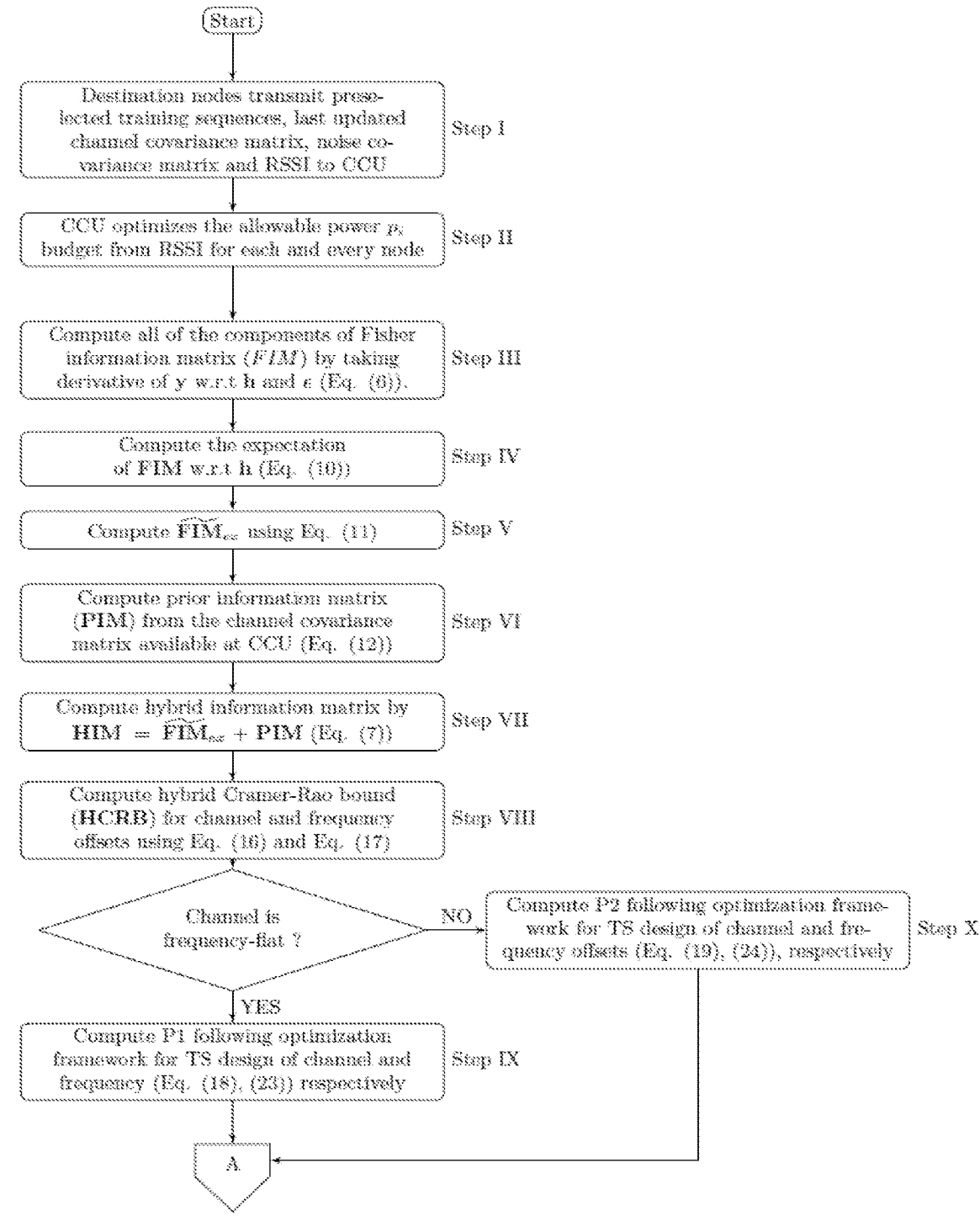
Figure 5B:
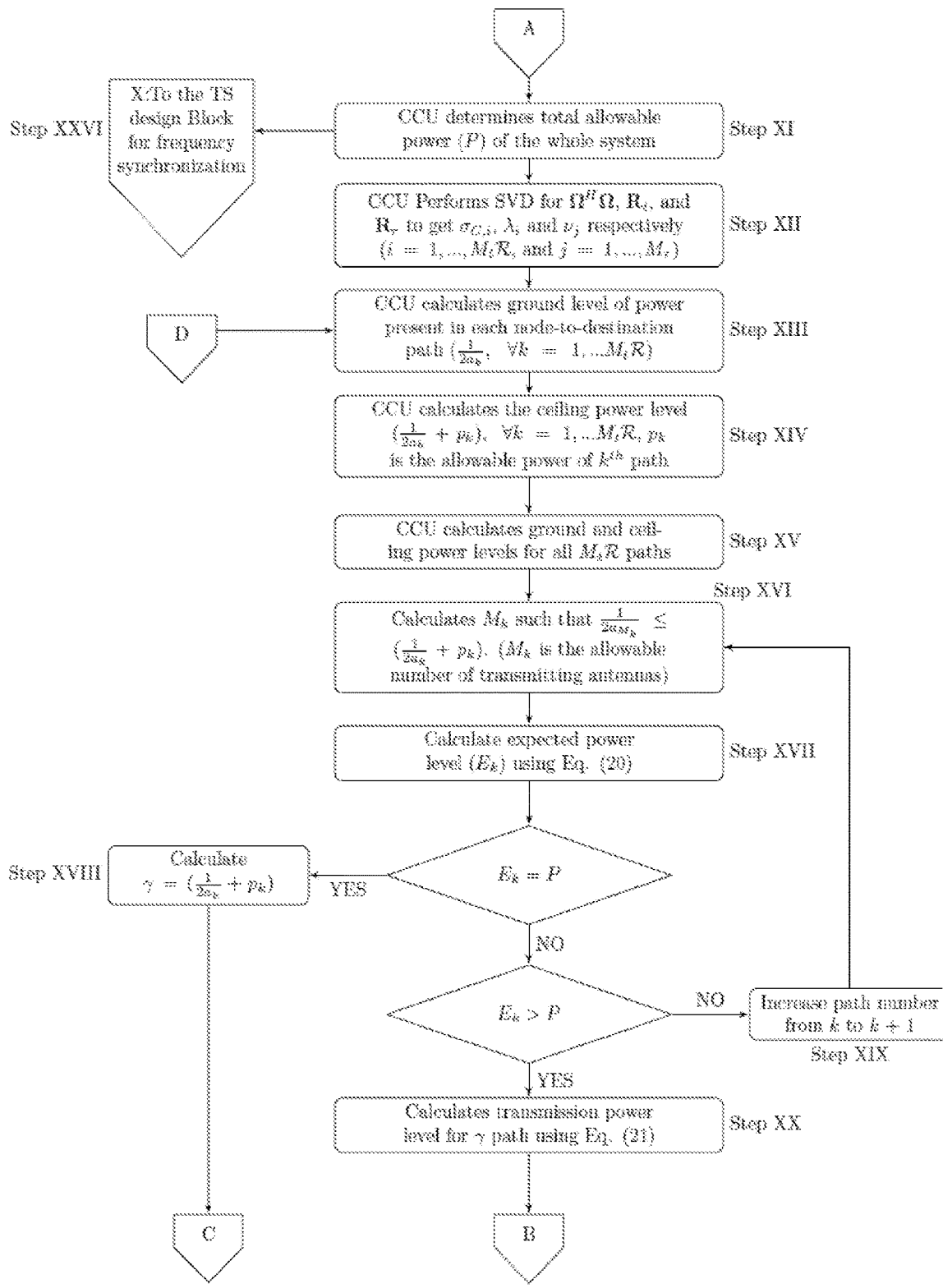
Figure 5C:
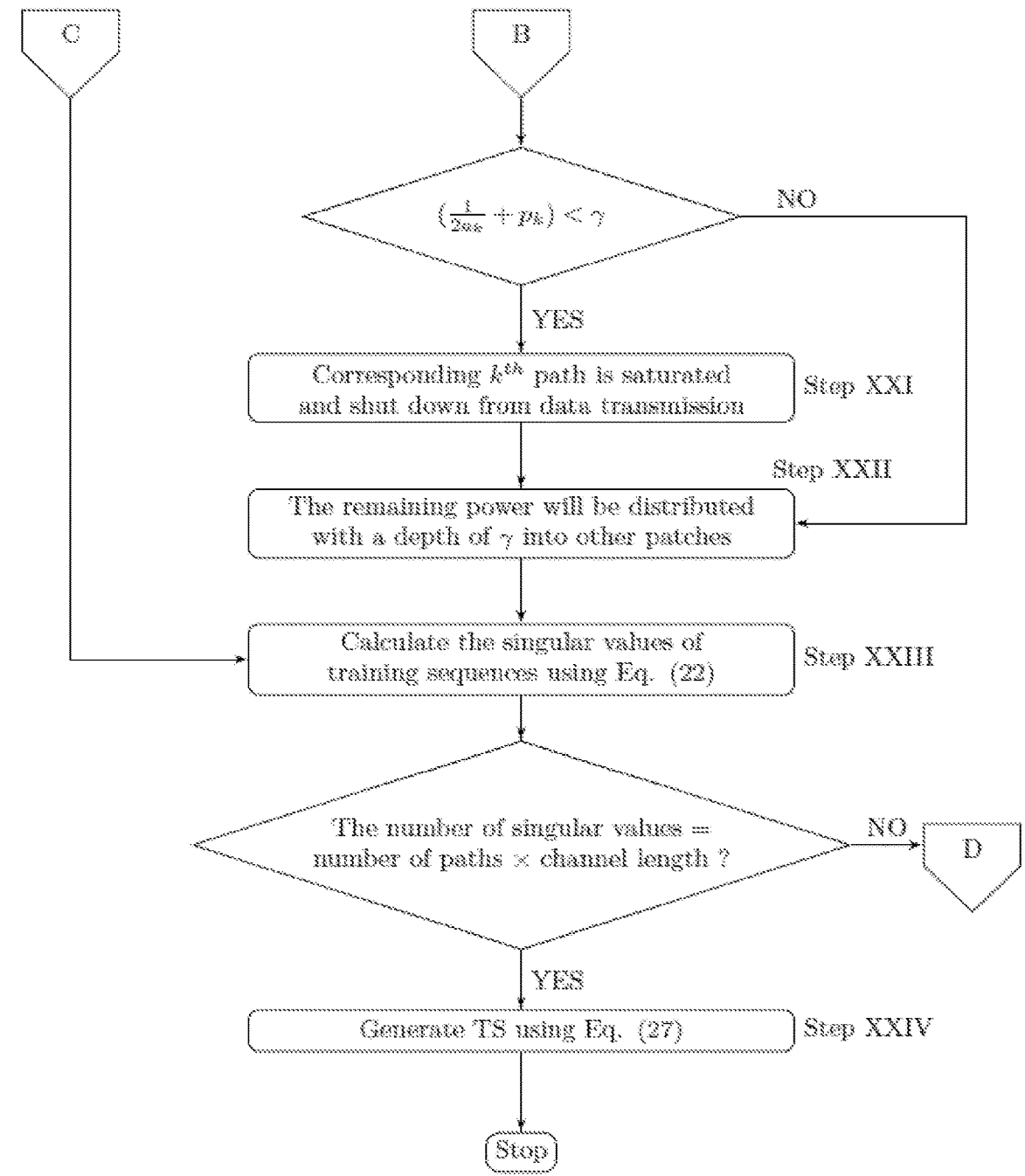

FIGS. 5A, 5B and 5C show the process flow diagram of the training sequence design method for channel estimation, according to one embodiment of present invention.

Figure 6A:
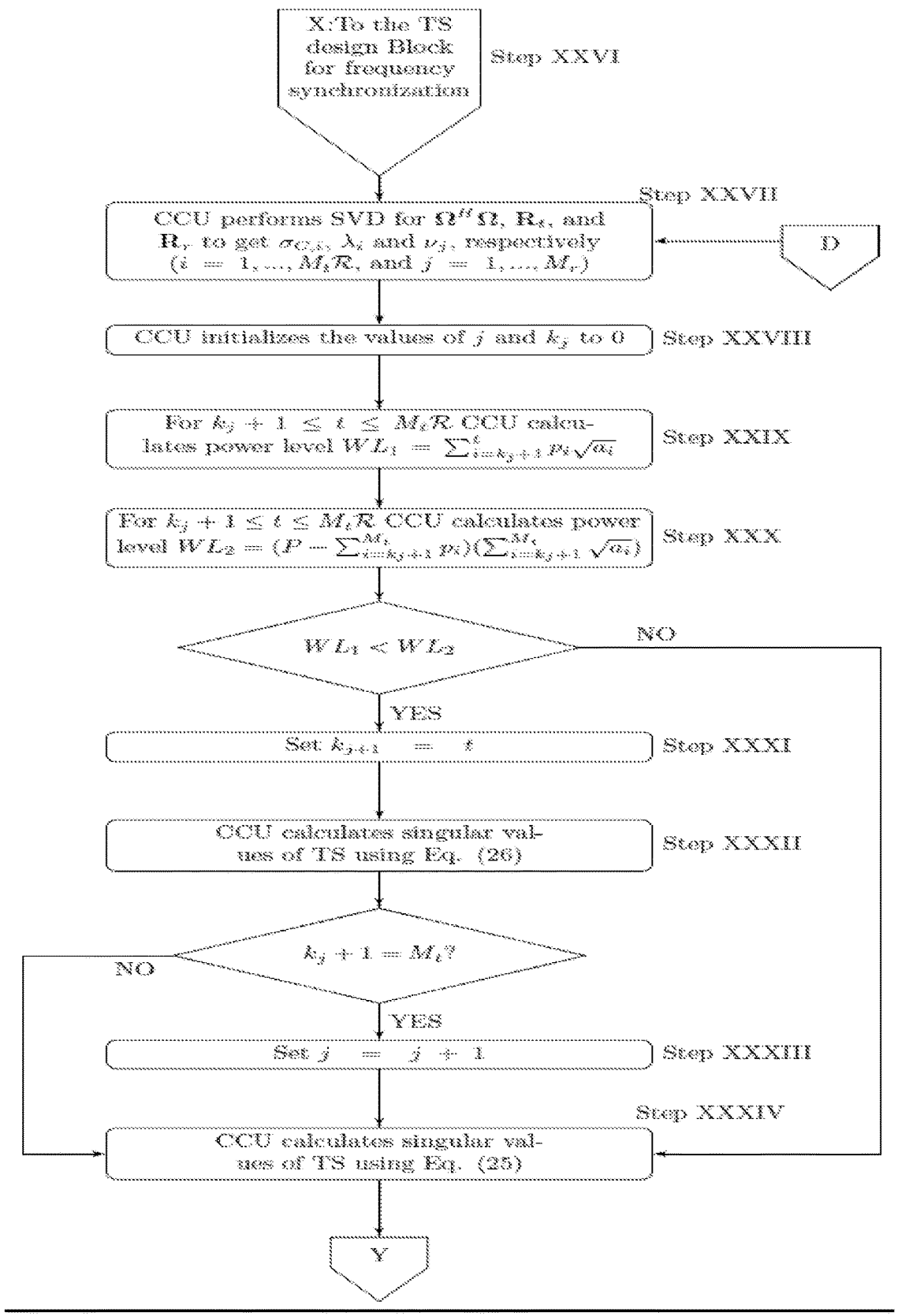
Figure 6B:
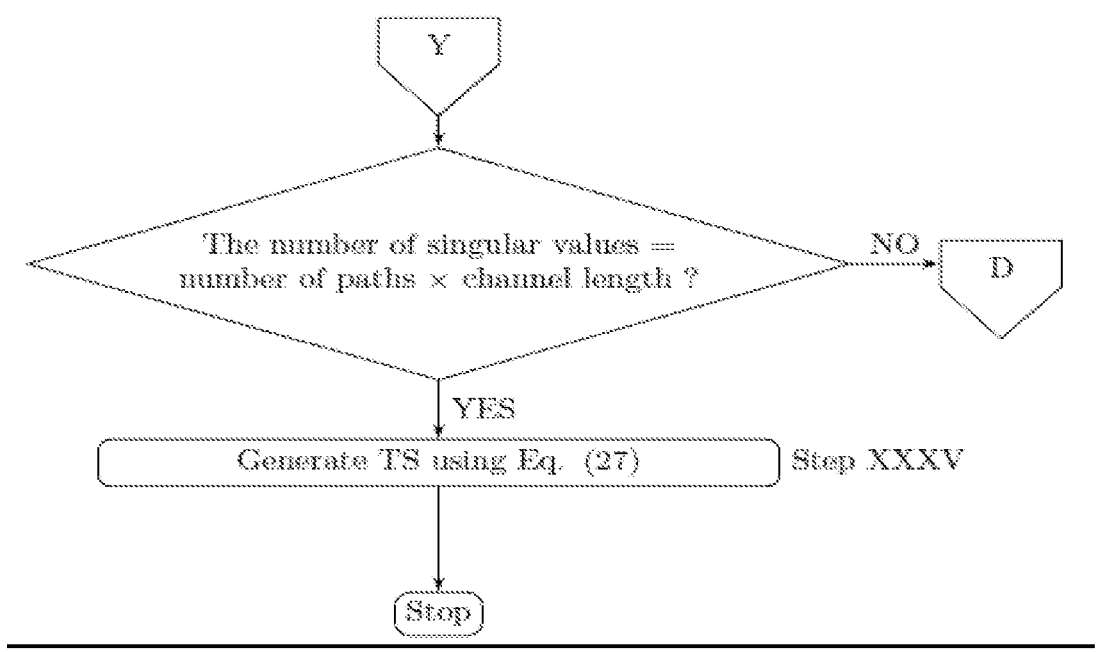

FIG. 6 shows process flow diagram of the training sequence design method for frequency synchronization, according to one embodiment of present invention.

Figure 7:
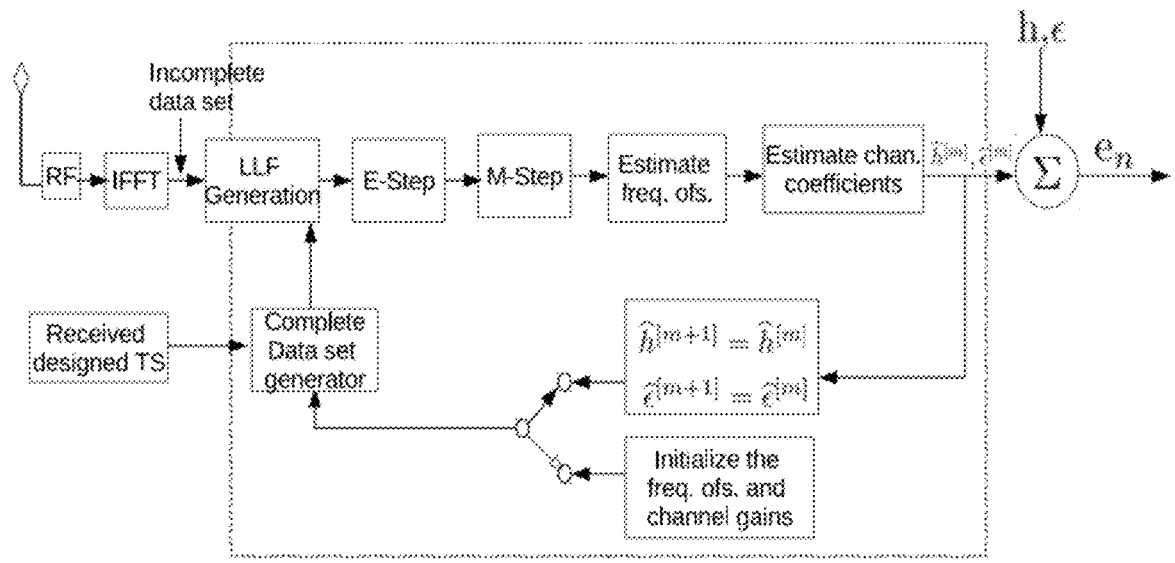

FIG. 7 shows the block diagram of channel estimation method, according to one embodiment of present invention.

FIG. 8 shows (a) MSE performance vs. SNR for different TSs for MCFOs estimation, (b) MSE performance vs. SNR for different TSs for channel estimation, according to one embodiment of present invention.

Figure 9:
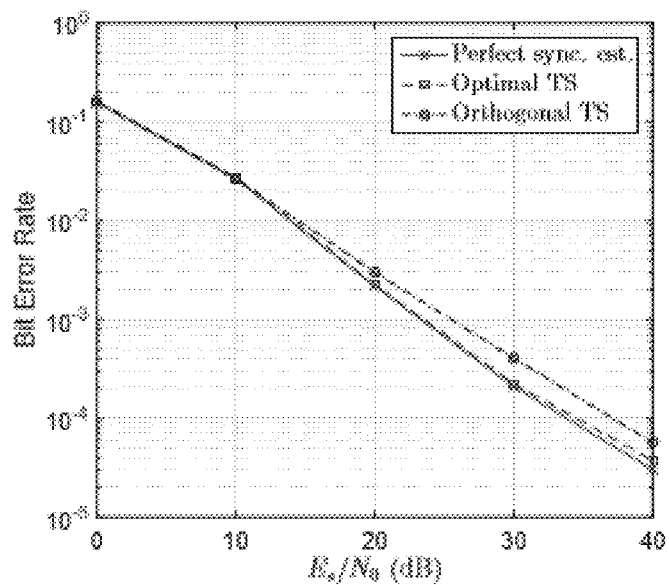

FIG. 9 shows bit error rate vs. SNR for various methods of TSs design, according to one embodiment of present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of exemplary embodiments of the invention. It includes various specific details to assist in that understanding but these are to be regarded as merely exemplary.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

The present invention is related to the development of a system and method for joint optimal training sequences design for spatially correlated channel estimation and frequency synchronization in Distributed multi-input multi-output (DMIMO)-OFDM systems.

Distributed multi-input multi-output (DMIMO) OFDM communication systems have a key enabler of small-cell deployment, capacity enhancement. In such network, the signal received at the destination node is characterized by multiple carrier frequency offsets (MCFOs) due to independent oscillators of the transmitting nodes and improper channel state information (CSI) as receiver does not know the channel. Hence, the knowledge of offsets and channel gains are required for coherent deployment of DMIMO-OFDM systems. In this patent, joint training sequence (TSs) design method is proposed for joint estimation of MCFOs and channel estimation over spatially correlated channel. The proposed TSs are short length, hence spectrally efficient.

Figure 1:
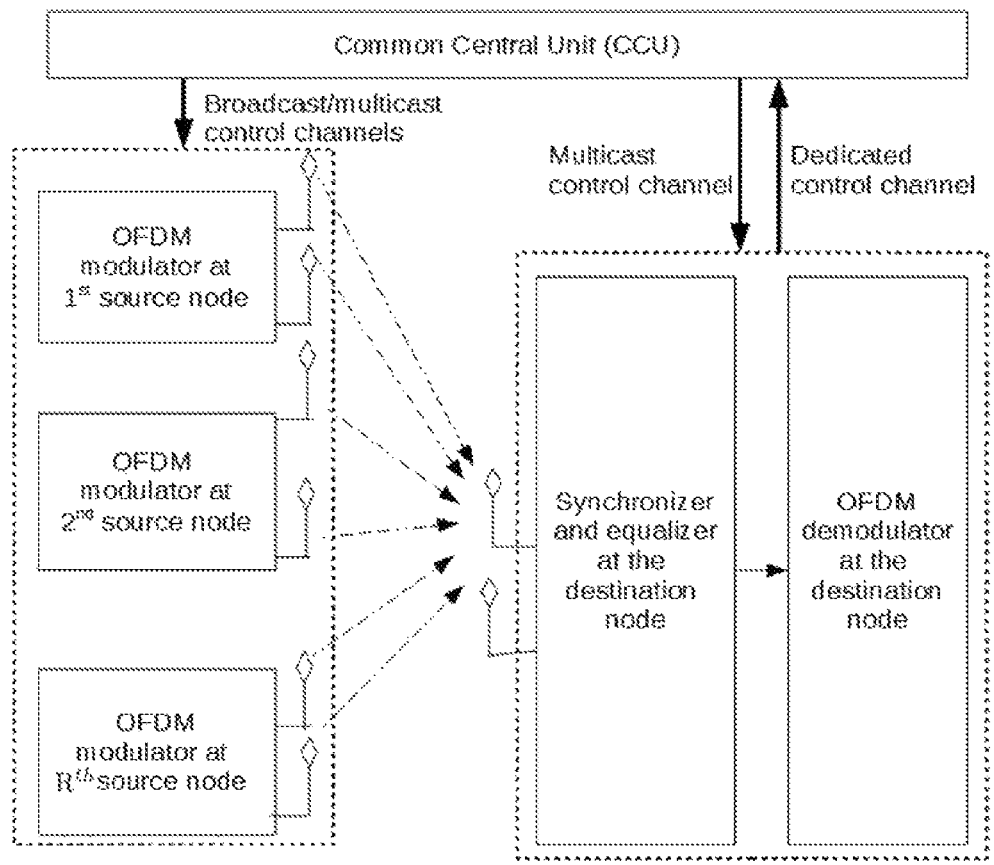
FIG. 1 shows the block diagram of DMIMO communication system, according to one embodiment of present invention.

In one implementation, FIG. 1 shows block diagram of a DMIMO communication system. The transmission system includes transmitting nodes having OFDM modulator with multiple transmit antennas. The receiving system includes synchronizer, equalizer units and OFDM demodulator. The transmitted symbols traverse over multiple paths of the wireless channels and received by the receiving antennas. The received symbols are synchronized, equalized and demodulated to retrieve the original transmitted signal at the receiver end.

Figure 2:
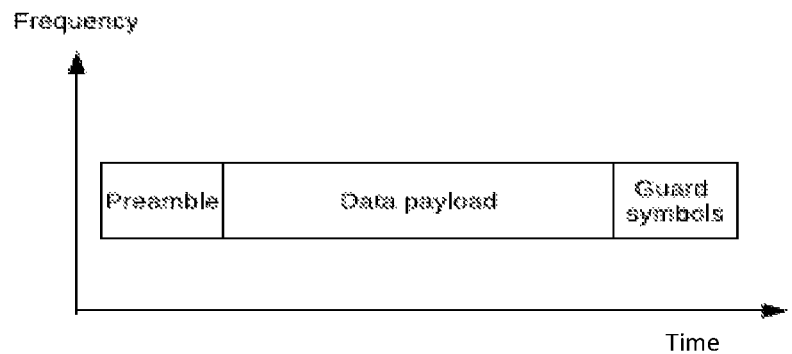
FIG. 2 shows the structure of packet transmitted with multiple OFDM symbols, according to one embodiment of present invention.

In one implementation, FIG. 2 shows the structure of transmitted packet, which consists of preamble, data payloads and guard symbols. The preamble contains training sequence, which helps the receiver to synchronize and equalize the received symbols. Data payload contains the information to be transmitted. Guard symbols may be padded at the end of data payload in order to distinguish between the transmitted packets.

In one implementation, FIG. 3 illustrates the pattern of the optimal TS information multicasted by CCU.

In one implementation, FIGS. 4(a) and (b) shows the method of training sequence generation for training sequence generation. At the beginning of transmission, common central unit (CCU) sends the predefined training sequence (TS) to source. In the next timing instant, source transmits using predefined TS to destination. Destination received the TS, starts estimating channel, calculates channel covariance, noise covariance matrix and measures received signal power (RSSI). In the next time instant, it feeds back RSSI, received signal, channel and noise covariance matrices to CCU. According to the RSSI, CCU determines how much power is assigned on transmit-receive antenna pair in each source-destination link. Considering each source node has same $M_t$ number of transmitting antennas, CCU generates $M_t R$ numbers of training sequences, where R is the number of source nodes. It prepares a look-up-table (LUT) which contains all the generated optimal TSs (initial LUT is prepared with high density of source-destination pair). It broadcast the LUT to all nodes. It multicast node identification number, antenna number corresponding row number of LUT, threshold for mean square error (MSE) of channel estimation to source antenna-destination pair.

In the implementation, the source nodes choose optimally designed TS as the preamble according to the LUT, add data payloads, guard symbols to produce OFDM packet as shown in the FIG. 2 and transmit those packets to the destination node. Destination computes mean square error (MSE) of channel estimation. If computed MSE is greater than predefined threshold received from CCU, then destination again sends RSSI, received signal, channel and noise covariance matrices to CCU. CCU reallocates the power budget for the said source-destination pair. If the computed power budget is less than some threshold, then CCU shuts down the corresponding source-destination path and informs related node about the updated row number and other source-destination pairs, if necessary. After selecting source nodes, OFDM packets transmission starts with the help of optimal training sequences. If the received OFDM packet is last one, then destination updates the CCU about last training sequence used, noise and channel covariance matrices.

(1) Training Sequence Design Method:

In one implementation, FIG. 5 and FIG. 6 shows the TS design method for channel estimation and frequency synchronization. A wireless network with R number of randomly spaced nodes and one destination is considered. Destination has $M_r$ number of antennas. The nodes have $M_t$ number of antennas. Spatial correlation among $M_t$ number of antennas is considered. The proposed DMIMO model is half duplex, i.e. can not transmit and receive simultaneously. The channels between nodes to destination are assumed to be quasi-static Rayleigh faded and constant for N consecutive OFDM training symbols. Each symbol has K number of subcarriers. The correlated channel for $r^{th}$ node may be modeled as $$g_{rl} = R_{rl}^{1/2} g_{rwl} (R_{tl}^{1/2})^T \qquad 1$$

where, the elements of $g_{rwl} \in C^{M_r \times M_t}$ are uncorrelated independent and identically distributed as $CN(0, I)$. $R_{rl} \in C^{M_r \times M_r}$ and $R^{tl} \in C^{M_t \times M_t}$ are receive and transmit correlation matrices, respectively. The vector of channel coefficients from $r^{th}$ node to destination may be represented as $h_r = [vec(g_{r0}), vec(g_{r1}), \ldots, vec(g_{r(L_h-1)})] \in C^{L_h M_t M_r}$, where, $L_h$ is the length of channel. $\epsilon_r$ is the frequency offset corresponding to $r^{th}$ node. Let, for K number of subcarriers, the training sequence is $s(k)$, $k=0, 1, \ldots, (K-1)$ or equivalently, $$S_r = [S(0), S(1), \ldots, S(K-1)]^T \in C^{K \times M_t} \qquad 2$$

$$S = [S_1 \ldots S_R] \qquad 3$$

Let, $M_r(S(k)) = [W_K^{k,0} S_r^T(k) \ W_K^{k,1} S_r^T(k) \ldots W_K^{k, (L_h-1)} S_r^T(k)]$, For K number of subcarriers, the received signal at the destination $$y = [\Gamma(\epsilon_1) M_1(S_1) \ldots \Gamma(\epsilon_R) M_R(S_R)]_{K \times L_h M_t R} \begin{bmatrix} h_1 \\ \vdots \\ h_R \end{bmatrix}_{L_h M_t R \times 1} + n \qquad 4$$

where, $y = [y(0) \ y(1) \ldots y(K-1)]^T \in C^{KM_r}$, the additive white Gaussian noise (AWGN) noise $n = [n(0) \ldots n(K-1)]^T \in C^{KM_r}$ with variance $\sigma_n^2 I_{K \times K}$,
$M_r(S_r) = [M_r(s(0)) M_r(s(1)) \ldots M_r(s(K-1))]^T = [F_0 s \ F_1 s \ldots F_{L-1} s] \otimes I_{M_r} \in C^{KM_r \times L_h M_t M_r}$, $F_l = $ diag $\{W_K^{kl}\}_{k=0,1,\ldots,(K-1), l=0,1,\ldots,(L_h-1)}$ and $\Gamma(\epsilon_r) = $ diag $\{e^{(j2\pi\epsilon_r)(0)/K}, \ldots, e^{(j2\pi\epsilon_r)(K-1)/K}\} \otimes I_{M_r} \in C^{KM_r \times KM_r}$.

Rewriting Eq. (3) as $$y = \Omega h + n \qquad 5$$

where, $\Omega = [\Gamma(\epsilon_1) M_1(S) \ldots \Gamma(\epsilon_R) M_R(S)]$ and $h = [h_1 \ldots h_R]^T$. The received signal vector y is circularly symmetric complex Gaussian random variable, i.e., $y \sim CN(\mu_y, \Sigma_y)$, with mean $\mu_y \triangleq \Omega h$ and covariance matrix $\Sigma_y = \sigma_n^2 \times I_K$. The parameter vector of interest for joint estimation of frequency offset and frequency-selective complex channel gains is given by $$\Delta = [Re\{h\}, Im\{h\}]^T \qquad 6$$

where, $\epsilon = [\epsilon_1, \ldots, \epsilon_R]^T$. The elements of Fisher information matrix (FIM) (Step III in FIG. 5) can be easily obtained by simple manipulation $$FIM = \frac{2}{\sigma_n^2} \begin{bmatrix} Re(\Omega^H \Omega) & -\Im m(\Omega^H \Omega) & \Im m(\Omega^H X h) \\ \Im m(\Omega^H \Omega) & Re(\Omega^H \Omega) & \Im m(\Omega^H X h) \\ -\Im m(\Omega^H X h) & Re(\Omega^H X h) & Re(h^H X^H X h) \end{bmatrix} \qquad 7$$

$\Omega$ and X are obtained by taking the derivative of y with respect to h and $\epsilon$. The hybrid Cramer-Rao bound (HCRB) is a lower bound on the joint estimation of random and deterministic parameters and not a function of the random parameters. To ensure generality, frequency offset is assumed to be deterministic and unknown parameters that can assume any value within the specified range. Channel is assumed to be random with zero mean and covariance matrix $R_h$ Gaussian distribution. The first step in determining the HCRB is to formulate the parameter vector of interest $\lambda \triangleq [\lambda_r, \lambda_d]$. The hybrid information matrix (HIM) (Step VII in FIG. 5) for estimation of the parameter of interest $\lambda$ $$HIM = E_{\lambda_r|\lambda_d}[FIM] + PIM \qquad (8)$$

where, PIM is the prior information matrix of random variable. The expected value of all the elements of FIM w·r·t$\lambda_r$ (Step IV in FIG. 5) are found, which results in terms, $$E_{\lambda_r}\{\Re e[h^H X^H X h]\} = \Re e[X^H X E(h h^H)] = \Re e[X^H X R_h] \qquad (9)$$

and $$E_{\lambda_r}\{\Im m[\Omega^H X h]\} = E_{\lambda_r}[\Re e(\Omega^H X h)] = 0 \qquad (10)$$

Hence, $$FIM_{ex} = E_{\lambda_r|\lambda_d}[FIM] = \begin{bmatrix} Re(\Omega^H \Omega) & -\Im m(\Omega^H \Omega) & 0 \\ \Im m(\Omega^H \Omega) & Re(\Omega^H \Omega) & 0 \\ 0 & 0 & Re(X^H X R_h) \end{bmatrix} \qquad (11)$$

The $FIM_{ex}$ for the real and imaginary part of channel coefficients are correlated with each other. So, $$\bar{FIM}_{ex} = \begin{bmatrix} 2\Omega^H \Omega & 0 \\ 0 & Re[X^H X R_h] \end{bmatrix} \qquad (12)$$

(Step V in FIG. 5)

-continued $$PIM = \begin{bmatrix} R_h^{-1} & 0 \\ 0 & 0 \end{bmatrix} \quad (13)$$

(Step VI in FIG. 5)

where, channel correlation matrix $$R_h = \begin{bmatrix} R_{h1} & \cdots & 0 \\ \vdots & \ddots & \vdots \\ 0 & \cdots & R_{hR} \end{bmatrix}_{L_h M_t RM_r \times L_h M_t RM_r} \quad (14)$$

Also the correlation matrix of the channel vector $h_r$ corresponding to the $r^{th}$ node is $$R_{hr} = \begin{bmatrix} R_{t0} \otimes R_{r0} & \cdots & 0 \\ \vdots & \ddots & \vdots \\ 0 & \cdots & R_{t(L_h-1)} \otimes R_{r(L_h-1)} \end{bmatrix}_{L_h M_t M_r \times L_h M_t M_r} \quad (15)$$

Hence, HIM is obtained as $$HIM = \begin{bmatrix} HIM_{hh} & 0 \\ 0 & HIM_{ee} \end{bmatrix} = \begin{bmatrix} 2\Omega^H \Omega + R_h^{-1} & 0 \\ 0 & \text{Re}(X^H X R_h) \end{bmatrix} \quad (16)$$

HCRB for frequency offset (Step VIII in FIG. 5)

$$HCRB(\epsilon) = \frac{\sigma_n^2}{2}[tr\{\text{Re}[X^H X R_h]\}^{-1}] \quad (17)$$

HCRB for complex channel gains (Step VIII in FIG. 5)

$$HCRB(h) = \frac{\sigma_n^2}{2}[tr\{2\Omega^H \Omega + R_h^{-1}\}^{-1}] \quad (18)$$

Optimization Framework for Training Sequence Design of Channel Estimation:

In one implementation, optimization framework for training sequence design of channel estimation is disclosed. It is desirable to generate FDM training sequence such that cross correlation between any two training sequences is essentially zero, i.e. $S^H F_l^H F_m S = 0$ when $0 \le l \ne m \le L_h - 1$. The optimal training sequence design is to find $S \in \mathbb{C}^{K \times M_t R}$ that minimizes the objective function HCRB(h), subject to the individual and total power constraint.

Case 1: For frequency-flat channel $L_h = 1$. Suppose, eigenvalue decomposition (Step XII in FIG. 5) of $R_t$ and $R_r$ are $R_t = U\Lambda U^H$, $R_r = V\tilde{\Lambda} V^H$, where, U and V are unitary matrices and $\Lambda = \text{diag}(\lambda_1, \ldots, \lambda_{M_t R})$, $\tilde{\Lambda} = \text{diag}(v_1, \ldots, v_{M_r})$, respectively. Suppose, $$a_i = \frac{1}{M_r} \lambda_i \sum_{j=1}^{M} v_j.$$

For any positive definite matrix $\Omega^H \Omega$, the diagonal elements are considered. $\text{diag}\{\Omega^H \Omega\} = \text{diag}(\sigma_{C,1}, \sigma_{C,2}, \ldots, \sigma_{C,M_t R})$. Hence, the optimization problem is equivalent to $$P1: \min_{\sigma_{C,i}} \sum_{i=1}^{M_t R} \frac{1}{\frac{1}{a_i} + 2\sigma_{c,i}} \quad (19)$$

Subject to $\sum_{m_t=0}^{M_t} \sigma_{C,i} \le P, \, o \le \sigma_{C,i} \le p_i$ (Step IX in FIG. 5)

Case II: For frequency selective channel, the diagonal elements of $R_{t,l}$, $R_{r,l}$ for $l^{th}$ channel path are $\Lambda_l = \text{diag}(\lambda_{l1}, \ldots, \lambda_{lM_t R})$ and $\tilde{\Lambda} = \text{diag}(v_{l1}, \ldots, v_{lM_r})$, respectively. Suppose, $$a_{li} = \frac{1}{M_r} \lambda_i \sum_{j=1}^{M_r} v_j.$$

For $l^{th}$ channel path and the positive definite matrix $\Omega^H \Omega$, the optimal solution is obtained when the singular values are diagonally aligned. i.e. $\tilde{Z} = \text{diag}(\sigma_{C,1}, \sigma_{C,2}, \ldots, \sigma_{C,M_t R M_r})$. Hence, the optimization problem is equivalent to $$P2: \min_{\sigma_{C,i}} \sum_{l=0}^{L_h-1} \sum_{i=1}^{M_t R} \frac{1}{\frac{1}{a l_i} + 2\sigma_{C,i}} \quad (20)$$

Subject to $\sum_{m_t=0}^{M_t} \sigma_{C,i} \le P, \, o \le \sigma_{C,i} \le p_i$ (Step X in FIG. 5)

A method of generating the training sequence for frequency-selective channel can be obtained from Eq. (19). Therefore, the CCU calculates the ground, ceiling power level, and $\sigma_{C,k}$ for each $l^{th}$ channel coefficients according to the algorithm stated below. Repeat the algorithm for $l_h$ number of times. Obtained Training Sequence for Channel Estimation:

In one implementation, the process of generating training sequence is described in FIG. 5. A method of generating and using the training sequence can be obtained from the Eq. (18). The CCU first calculates ground level of power already present in each node-to-destination path $$\frac{1}{a_1} \le \ldots \le \frac{1}{2a_{M_t R}}$$

(Step XIII in FIG. 5). Again, it calculates ceiling power level $$\left(\frac{1}{2a_k} + p_k\right)$$

of $k^{th}$ patch (step XIV in FIG. 5). Then, it calculates the expected power level (Step XVII in FIG. 5) as $$E_k = \sum_{i=1}^{M_k} \left(\frac{1}{2a_k} + p_k - \frac{1}{2a_i}\right) - \sum_{i=1}^{k-1}\left(\left(\frac{1}{2a_k}+p_k\right)-\left(\frac{1}{2a_i}+p_i\right)\right) \quad (21)$$

where, $M_k$ is such that $$\frac{1}{2a_M} \le \frac{1}{2a_k} + p_k$$

(Step XVI in FIG. 5). If $E_k$=P, it calculates $$\gamma = \frac{1}{2a_k} + p_k$$

(Step XVIII in FIG. 5). The power level required for transmission $k^{th}$ patch is =

$$\frac{1}{\sqrt{\mu}}.$$

If $E_k$=P, calculate $\gamma$ using, $$\sum_{i=k}^{M_k} \max\left\{0, \gamma - \frac{1}{\sqrt{2}\, a_i}\right\} = P - \sum_{i=1}^{k-1} p_i \quad (22)$$

(Step XX in figure 5)

If the ceiling level is less than $\gamma$, then the corresponding $k^{th}$ patch is saturated (Step XXI in FIG. 5). No more power can be poured in that patch. The particular patch is shut down from data transmission for that time instance. Otherwise, the remaining amount of power will be distributed with a depth of $\gamma$ into the other patches (Step XXII in FIG. 5). The diagonal elements of training sequence can be calculated using the value of $\gamma$ as $$\sigma_{c,k} = \gamma - \frac{1}{2a_k} \quad (23)$$

(Step XXIII in figure 5)

If $E_k$<P, calculate the optimum $M_k$ for k=(k+1)$^{th}$ patch. Repeat the above stated algorithm to get the optimum training sequences.

Optimization Framework for Training Sequence Design of Frequency Synchronization:

Case I: For frequency-flat channel $L_{h}$=1. Suppose, eigenvalue decomposition (Step XXVII in FIG. 5) of $R_t$ and $R_r$ are $R_t$=U$\Lambda$U$^H$, $R_r$=V$\tilde{\Lambda}$V$^H$, where, U and V are unitary matrices and $\Lambda$=diag($\lambda_1$, ..., $\lambda_{M_tR}$), $\tilde{\Lambda}$=diag($v_1$, ..., $V_{M_r}$), respectively. Suppose, $$a_i = \frac{1}{M_r}\lambda_i \sum_{j=1}^{M_r} v_{ji}.$$

For any positive definite matrix $\Omega^H\Omega$, the diagonal elements are considered. Diag$\{\Omega^H\Omega\}$=diag($\sigma_{C,1}$, $\sigma_{C,2}$, ..., $\sigma_{C,MtR}$). Optimal $\sigma_{C,i}$ (Step VIII in FIG. 5) can be found from $$P1: \min_{\sigma_{C,i}} \sum_{i=1}^{M_tR} \frac{1}{\sigma_{C,i}a_i} \quad (24)$$

Subject to $\sum_{i=1}^{M_tR} \sigma_{C,i} \le P,\ o \le \sigma_{C,i} \le p_i\ i=1,\ldots, M_tR$ (Step IX in figure 5)

Case II: For frequency selective channel, the diagonal elements of $R_{t,l}$, $R_{r,l}$ for $l^{th}$ channel path are $\Lambda_l$=diag($\lambda_{l1}$, ..., $\lambda_{lM_tR}$), $\tilde{\Lambda}$=diag($v_{l1}$, ..., $v_{lM_r}$), respectively. Suppose, $$a_{l,i} = \frac{1}{M_r}\lambda_i \sum_{j=1}^{M_r} v_j.$$

For $l^{th}$ channel path and the positive definite matrix $\Omega^H\Omega$, the optimal solution is obtained when the singular values are diagonally aligned. i.e. $\tilde{Z}$=diag($\sigma_{C,1}$, $\sigma_{C,2}$, ..., $\sigma_{C,M_tR}$). Hence, the optimization problem is equivalent to $$P2: \min_{\sigma_{C,i}} \sum_{l=0}^{L_h-1} \sum_{i=1}^{M_tR} \frac{1}{\sigma_{C,i}a_{li}} \quad (25)$$

Subject to $\sum_{i=1}^{M_tR} \sigma_{C,i} \le P\ \ o \le \sigma_{C,i} \le p_i\ \ i=1,\ldots, M_tR$ (Step X in figure 5)

Obtained Training Sequence for Frequency Synchronization:

In one implementation, the process of generating training sequence for frequency synchronization is described as shown in FIG. 6. The CCU first initialize the values of j, $k_j$ to 0 (Step XXVIII in FIG. 6). For $k_j$+1≤t≤$M_k$ calculate two power levels WL$_1$=$\Sigma_{i=k_j+1}^t p_i\sqrt{a_i}$ (Step XXIX in FIG. 6) and WL$_2$=(P-$\Sigma_{i=1}^{k_j}p_i$) ($\Sigma_{i=k_j+1}^{M_tR}\sqrt{a_i}$) (Step XXX in FIG. 6). If the power level WL$_2$ is lowest, CCU calculates $\sigma_{C,k}$ (Step XXXIV in FIG. 6) using $$\sigma_{C,k} = \frac{1}{\sqrt{a_k}}\left(P - \sum_{i=1}^{k_j} p_i\right)\left(\sum_{i=k_j+1}^{M_k} \sqrt{a_i}\right) \quad (26)$$

for $k_j + 1 \le k \le M_t$

Otherwise, if WL$_1$ gives the lowest power level, set $k_{j+1}$=t (Step XXXI in FIG. 6), and Calculate $$\sigma_{C,k} = \frac{1}{\sqrt{a_k}}\left(P - \sum_{i=k_j+1}^{k_{j+1}} p_i\sqrt{a_i}\right) \quad (27)$$

for $k_j + 1 \le k \le k_{j+1}$ (Step XXXII in figure 6)

If $k_j+1=M_t$ then set $j=j+1$, and again CCU calculates $\sigma_{C,k}$ using Eq. (25). Otherwise set $j=j+1$, and repeat the training sequence generation process again (Step XXXIII in FIG. 6). There are $M_tR$ number of paths with a depth of $$\frac{1}{\sqrt{a_k}}.$$

A total P amount of power has been poured into all paths. The power levels of all paths will increase simultaneously. If the power level of any path reaches its maximum value, then no power has poured into this path. The remaining amount of power will be distributed into other paths. The final power level of each path is described by the value of $\sigma_{C,k}$.

After generating the singular values $\sigma_{C,k}$, the training sequence can be recovered back from Z by $$S = Q_K \begin{bmatrix} Z^{\frac{1}{2}} \\ 0_{(K-M_tR) \times M_tR} \end{bmatrix} \quad (28)$$

(Step XXIV in figure 5) and (Step XXXV in figure 6)

with unitary matrix $Q_K \in \mathbb{C}^{K \times K}$. A further advantage in designing training sequences according above stated technique is that, $S^H F_l^H F_m S = 0$ when $0 \le l \ne m \le L_h - 1$. This ensures the orthogonality between the training sequences. A joint estimator estimating various impairments (MCFOs and channel gains) using these training sequences and can effectively attain theoretical lower bound. Accordingly, such sets of training symbols can enable estimator in achieving theoretical bound.

In one implementation, a system for estimation of channel and frequency offsets, after getting the optimum training sequence is disclosed. CCU prepares a look-up-table (LUT) which contains all the generated optimal TSs. CCU broadcast the LUT to all nodes and multicast row number of LUT to source antenna-destination pair. After receiving that information from CCU, source nodes use the sequence of the corresponding row number, which is sent by CCU. Node antennas transmit OFDM data payloads along with training sequence. The receiver estimates the frequency offset and channel characteristics from the received training sequences.

After getting the optimum training sequence, the receiver uses those sequences to estimate the channel and frequency offsets. FIG. 7 describes the block diagram of MCFOs and channel estimation. Hence, the parameters to be estimated are $\theta=[\epsilon, h]$. The RF section transform RF waves to baseband signal, which in turn fed to Inverse fast Fourier transform (IFFT) block. It converts the frequency domain signal to time domain signal, which is termed as incomplete data set. The complete data set is also generated by using the received optimal training sequence and the estimated channel characteristics obtained from previous time instance in the block named as complete data set generator. The complete data set for $r^{th}$ transmitting node is described by $$z_r = \Gamma(\epsilon_r) M_r(S_r) h_r + w_r \quad (29)$$

The log-likelihood generator generates a log-likelihood function (LLF) which in turn fed to expectation block. The expectation of the LLF given the parameters to be estimated, is given as $$N(\theta|\hat{\theta}^{[m]}) \triangleq E\{\log f(z|\theta)|y, \hat{\theta}^{[m]}\} \quad (30)$$

The maximization block provides an output of $\theta$ at the $(m+1)^{th}$ step, which can be written as $$\hat{\theta}^{[m+1]} = \arg\min_\theta \left\| \hat{z}^{[m]} - \sum_{r=1}^{R} \Gamma(\epsilon_r) M_r(S_r) h_r \right\|^2 \quad (31)$$

The updated MCFOs $\hat{\epsilon}^{[m+1]}$ is obtained as $$\hat{\epsilon}_r^{[m+1]} = \arg\max_\epsilon \left[ z_r^H \Omega h (\Omega^H \Omega)^{-1} \Omega^H h^H z_r \right] \quad (32)$$

where, $\Omega = \sum_{r=1}^{R} \Gamma(\epsilon_r) M_r(S_r)$ The updated channel coefficient $\hat{h}^{[m+1]}$ is obtained as $$\hat{h}_r^{[m+1]} = (\Omega^H \Omega)^{-1} \Omega^H z_r \quad (33)$$

Destination calculates MSE for frequency offset and channel gains. If computed MSE for channel estimation is greater than predefined threshold received from CCU, then destination again sends RSSI and received signal. CCU reallocates the power budget for the said source-destination pair. If the computed power budget is less than some threshold, then CCU shuts down the corresponding source-destination path and informs related node about the updated row number and other source destination pairs, if necessary.

Performance Analysis

In one exemplary implementation, simulation results are presented in order to evaluate the performance of proposed system and methods. Without loss of generality, it is assumed that $$\sigma_w^2 = \frac{1}{SNR}.$$

Normalized frequency offset at the destination, $\epsilon_{m_t}^{RD}$ is assumed to be uniformly distributed over the range of (−0.5, 0.5). Assuming uniform antenna array, the Kronecker correlation matrix model is adopted. A channel with a length of $L_h=5$ is considered. Performance metric of the proposed estimators is evaluated by means of their respective MSE and BER. Three transmitting nodes each equipped with two antennas following the DF protocol send decoded data to the destination. Other simulation parameters are listed in the Table 1.

TABLE 1

| Orthogonal Training sequences | Zadoff-Chu sequence |
|---|---|
| Length of orthogonal TS | 64 |
| Channel Length ($L_h$) | 5 |
| Threshold ($\xi$) | 0.001 |
| Fr. Offset range (u: Unif. distn.) | u (−0.5, 0.5) |
| LTE Band Number | 23 |
| Bandwidth | 20 MHz |
| Centre Frequency | 2190 MHz |
| No. of OFDM symbols | 7 |
| FFT Size | 2048 |
| No. of data Subcarriers/OFDM | 1200 |
| CP Length | 144 |
| Subcarrier Spacing | 15 KHz |

Figure 8A:
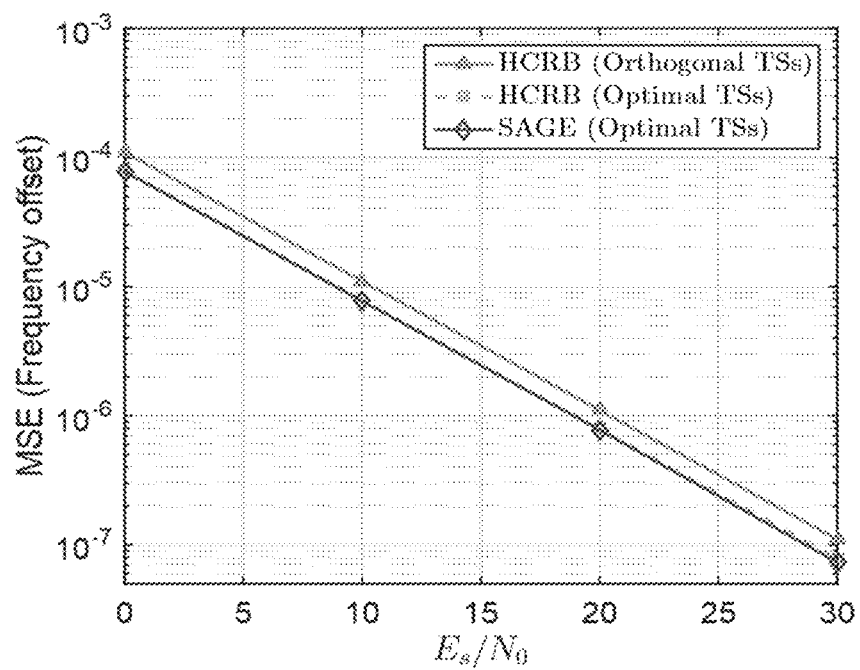
Figure 8B:
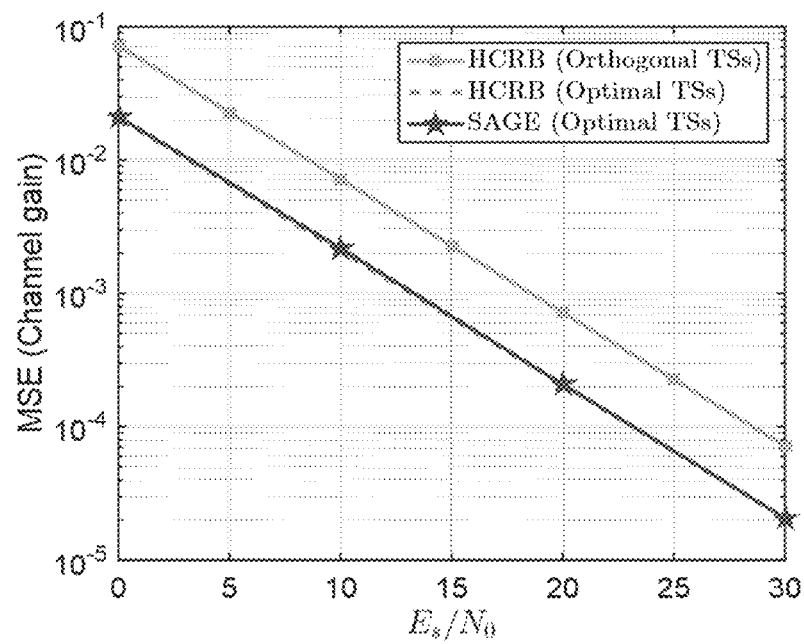

In one implementation, the MSE for the estimation of a parameter, timing offset, is defined as the average MSE over 1000 simulations, i.e. $\Sigma_{frame=1}^{100} \Sigma_{ro=1}^{10} (\hat{\epsilon} - \epsilon_r)^2 / 1000$. FIG. 8 shows the performance of the proposed TS. The HCRBs for frequency offsets and channel gains estimation with proposed optimum designed TSs results in 1.5 dB and 5 dB SNR improvement when compared with the HCRBs with orthogonal TSs (like Zadoff-Chu sequence), respectively as shown in FIGS. 8a and 8b respectively. The SAGE estimator performance for joint estimation of MCFOs and channel gains with designed optimum TSs closely match with the HCRBs of optimum TSs. Further, the BER performance of the DMIMO-OFDM system with proposed optimal TSs is estimated. Quadrature phase shift keying (QPSK) constellation is used for the transmission of information.

In one implementation, FIG. 9 shows BER performance with optimum sequence. For comparison, BER for perfect channel and MCFOs estimation is provided. The BER performance of DMIMO-OFDM system with optimum TSs improves by 2 dB SNR gain than that of orthogonal TSs.

Some of the noteworthy features of the present invention are:
- A method of providing joint estimation for DMIMO-OFDM system with multiple antennas at the nodes over spatial correlated channels.
- The training sequence design depends on optimal selection of two power constraints, (a) total power of the whole system, (b) individual power constraint over each transmitting nodes. These two power budgets are controlled by one common central unit (CCU).
- The designed optimal training sequences are of short length and require two second transmission time only, hence they are spectrally efficient.
- In one aspect, training sequence is designed by considering the frequency-flat channel. The length of said training sequence is equal to number of transmit antennas which have maximum power content.
- In other aspect, training sequence is designed by considering each channel path individually for frequency-selective channel.
- The length of said training sequence is equal to number of transmit antennas which have maximum power content multiplied with number of channel paths.
- The designed training sequence invokes zero cross-correlation as a property resulting in estimation of channel without any matrix inversion, which significantly lowers the complexity of the estimation algorithm.
- The optimal training sequences of frequency offsets and channel estimation are diagonal which preserves the orthogonality between all transmit antennas in order to avoid false estimation.
- The designed optimal training sequences are applicable for collocated as well as distributed antenna system.
- A Method of generating optimal training sequences for joint estimation of MCFOs and channel estimation in DMIMO systems with OFDM modulation over spatially correlated channel with individual and overall power constraint is presented in this patent.
- The optimal training sequence is short length, hence spectrally efficient.
- Low complexity in hardware is required in generation of TSs.
- The constraints on the power in generation further ensures its applicability in energy efficient communication systems.
- The training sequences are diagonal which ensures the orthogonality among the training symbols of different transmit antennas resulting in reduced false estimation. This results in proper estimation following perfect equalization and detection steps.

Some of the non-limiting advantages of the present invention are:
- The method of training sequence design is optimal for joint frequency offset and channel estimation over spatially correlated channel.
- The method of training sequence design is optimal for collocated and distributed communication systems with multiple antenna node structure.
- The intelligent DMIMO system employing distributed antenna system (DAS) indicates a leap to large scale antenna system (LSAS) if the number of nodes can be made scalable. This method of TS design may also applicable to LSAS.
- The optimal training sequence is of short length.
- The developed training sequence design method requires less power consumption. Proposed sequence is power efficient in terms of hardware implementation at the receiver.
- The method of optimal TS generation disclosed in the present invention enables fast update of TSs based on dynamic change in networks.
- The developed method of optimal TS generation is equally logically applicable for highly mobile environment, i.e. nodes of the system are mobile.
- Time domain training sequence design method, disclosed in the present invention, effectively reduces the interference between training sequence and information bearing signal.
- The common central unit (CCU) has a control over the power budget of the DMIMO-OFDM systems.
- The method of generating training sequences ensures the cross-correlation between any two set of training sequences is essentially zero. The zero cross-correlation ensures the orthogonality between any set of training sequences that reduces false estimation.

Although a system and a method for optimal training sequence generation for joint channel and frequency offsets estimation in DMIMO-OFDM systems have been described in language specific to structural features, it is to be understood that the embodiments disclosed in the above section are not necessarily limited to the specific methods or devices described herein. Rather, the specific features are disclosed as examples of implementations of the system and method for optimal training sequence generation for joint channel and frequency offsets estimation in DMIMO-OFDM systems.

We claim:

1. A method of generation and utilization of optimal training sequences (TSs) for joint channel and frequency offset estimation in distributed multiple-input multiple-output (DMIMO) orthogonal frequency division multiplexing (OFDM) system over spatially correlated channel in a wireless communication network, wherein said method comprising:

sending, by a common central unit (CCU), a predefined TSs to a plurality of source nodes provided with a plurality of antennas;

transmitting by the plurality of source nodes, said predefined TSs to a plurality of destination nodes, forming source-destination pair links, and the plurality of destination nodes send a measured received signal strength indicators (RSSI) to said CCU;

wherein, said CCU is configured to optimize or allocate power budgets for each transmit-receive antenna pair in each source-destination pair link according to said RSSI, and said CCU selects said optimal training sequences (TSs);

wherein said source nodes are configured to transmit OFDM packets to a destination according to said optimal training sequences (TSs).

2. The method as claimed in claim 1, wherein after receiving said predefined TSs, said plurality of destination nodes are configured to estimate channel, calculates channel covariance, noise covariance matrix and measures received signal power (RSSI).

3. The method as claimed in claim 2, wherein said plurality of destination nodes sends RSSI, received signal, channel and noise covariance matrices to the CCU.

4. The method as claimed in claim 1, wherein said CCU defines a threshold on said power budget.

5. The method as claimed in claim 4, wherein said CCU configured to shut down a source-destination pair link if said power budget is less than said threshold.

6. The method as claimed in claim 4, wherein if said power budget is more than said threshold, said CCU configured to generates $M_tR$ numbers of said optimal training sequences (TSs), where $M_t$ defines the number of transmitting antennas and R is the number of source nodes.

7. The method as claimed in claim 6, wherein the CCU broadcasts a look-up table (LUT) containing the updated optimal training sequences, to said source-destination pair and multicast row number of the LUT for next transmission.

8. The method as claimed in claim 6, wherein said CCU multicasts row number of said LUT, node identification number, antenna number and threshold of MSE of channel estimation to each source-destination pair.

9. The method as claimed in claim 8, wherein said source node transmits said OFDM packets to said destination node by using said optimal TSs selected as per said row number as instructed by said CCU.

10. The method as claimed in claim 9, wherein said destination node computes mean square error (MSE) of channel estimation.

11. The method as claimed in claim 10, wherein if said MSE is greater than threshold, said destination node sends RSSI, received signal to the CCU.

12. The method as claimed in claim 1, wherein for the last packet transmission, said destination node configured to update said CCU about a last training sequence used, noise and channel covariance matrices.

13. The method as claimed in claim 1, wherein for generation of said optimal TSs, the CCU computes hybrid Cramer-Rao bound (HCRB) for channel and frequency offset estimation.

14. The method as claimed in claim 13, wherein said HCRB for channel estimation is obtained by computing hybrid information matrix (HIM).

15. The method as claimed in claim 14, wherein said HIM is obtained by taking the addition of expected value of Fisher information matrix (FIM) and prior information matrix (PIM).

16. The method in claim 15, wherein said PIM is obtained from precomputed channel covariance matrix in the destination node which is feedback to said CCU.

17. The method as claimed in claim 14, wherein said HCRB for channel offset estimation is computed by taking the inverse of $HIM_{hh}$.

18. The method as claimed in claim 13, wherein said HCRB for frequency offset estimation is obtained from $HIM_{ee}$.

19. The method as claimed in claim 13, wherein said CCU computes singular values of the HCRB of channel offset estimation matrix by eigen value decomposition.

20. The method as claimed in claim 13, wherein said CCU computes singular values of HCRB of frequency offset estimation matrix by eigen value decomposition.

21. The method as claimed in claim 13, wherein said CCU computes singular values of channel covariance matrix by eigen value decomposition.

22. The method as claimed in claim 19, wherein the singular values of training sequences are optimized and the optimized singular value of training sequence for channel offset estimation is obtained by minimizing the singular value of HCRB of channel estimation summation over all the antennas according to total power constraint (P) and allocated power constraint for the source-destination link.

23. The method as claimed in claim 22, wherein said optimized singular value of training sequence is obtained from ground and ceiling power levels for each source-destination link, calculated in the CCU.

24. The method as claimed in claim 23, wherein said ground power levels for each link is obtained by ½ of inverse of singular values of the channel covariance matrix.

25. The method as claimed in claim 23, wherein said ceiling power level for each link is obtained by addition of ½ of inverse of singular values of the channel covariance matrix and allotted power budget of the source-destination pair link computed by said CCU.

26. The method as claimed in claim 23, wherein said source-destination link ($M_k$) is selected for transmission from the set of $M_tR$ ($M_k \leq M_tR$) such that summation of ground power levels over $M_k$ is less than or equal to the ceiling level of the link.

27. The method as claimed in claim 23, wherein said CCU calculates expected power level by computing: (ceiling power level of $k^{th}$ path-summation of ground levels over $M_k$)−(ceiling power level of $k^{th}$ path-summation of ceiling levels over all paths).

28. The method as claimed in claim 23, wherein if expected power level is equal to overall power (P) of the system, said CCU computes the power depth (γ) by the ceiling power level.

29. The method as claimed in claim 19, wherein the optimized singular value of training sequence for frequency offset estimation is obtained by minimizing the singular value of HCRB of MCFO (multiple carrier frequency offsets) estimation summation over all the antennas according to total power constraint (P) and allocated power constraint for the source-destination link.

30. The method as claimed in claim 1, is non-linear, wherein the CCU initializes j and kj to zero.

31. The method as claimed in claim 26, wherein each source-destination link ($M_k$) is selected such that such that summation of allotted power level for each link over $M_k$ is less than overall power P.

32. The method as claimed in claim 31, wherein the CCU computes two power levels (WL1 and WL2) or each transmit-receive link.

33. The method as claimed in claim 32, wherein one power level (WL1) computed by taking summation of X over t where $kj+1 \leq t \leq M_k$, X is obtained as multiplication of power allotted for each link ($p_i$) with square root of singular value of channel covariance matrix.

34. The method as claimed in claim 33, wherein second power level (WL2) is computed by following manner (total overall system power-summation of pi over kj+1)×(summation of square root of singular value of channel covariance matrix over all links).

35. The method as claimed in claim 32, wherein if WL1 is greater than WL2, the CCU calculates optimal singular value of the training sequence $\sigma_{C,i}$ of TS.

36. The method as claimed in claim 32, wherein if WL1 is less than WL2, the CCU sets kj+1=t and calculates optimal singular value of the training sequence $\sigma_{C,i}$ of TS.

37. The method as claimed in claim 30, wherein if kj+1 is equal to $M_k$, increase kj to kj+1 and the CCU calculates optimal singular value of the training sequence $\sigma_{C,i}$ of TS.

38. The method as claimed in claim 13, wherein the optimal TS is designed by arranging the computed values diagonally with other entries of matrix zero, wherein the computed values are optimal singular.

39. The method as claimed in claim 13, wherein the generated optimal training sequences are of short length and requires a total transmission time which is twice the transmission time of a single optimal transmission sequence.

40. The method as claimed in claim 1, wherein said optimal training sequence is generated by using a frequency-flat channel.

41. The method as claimed in claim 30, wherein a length of said optimal training sequence is equal to number of transmit antennas which have maximum power content.

42. The method as claimed in claim 1, wherein said optimal training sequence is designed by using each channel path individually for frequency-selective channel.

43. The method as claimed in claim 32, wherein length of said optimal training sequences are equal to number of transmit antennas which have maximum power content multiplied with number of channel paths resulting in minimum length of optimal training sequences.

44. The method as claimed in claim 1, wherein said optimal training sequences of frequency offsets and channel estimation are diagonal which ensures the orthogonality among the training symbols of different transmit antennas.

45. A system for generation and utilization of optimal training sequences (TSs) for joint channel and frequency offset estimation in distributed multiple-input multiple-output (DMIMO) orthogonal frequency division multiplexing (OFDM) system with plurality of antennas over spatially correlated channel in a wireless communication network, wherein said system comprising: a plurality of source nodes, a common central unit (CCU), and a plurality of destination nodes;

wherein, said CCU configured to generate a look-up-table (LUT) containing the optimal TSs and broadcast the LUT to said plurality of source nodes and multicast row number of the LUT to source-destination link pair.

46. The system as claimed in claim 45, wherein after receiving information from the CCU, the plurality source nodes adapted to use the sequence of the corresponding row number sent by said CCU.

47. The system as claimed in claim 46, wherein said plurality of source nodes transmit OFDM data payloads along with training sequence to the plurality of destination nodes and said plurality of destination nodes estimate the frequency offset and channel characteristics from the received optimal training sequences.

* * * * *